United States Patent
Lane et al.

(10) Patent No.: US 9,761,919 B2
(45) Date of Patent: Sep. 12, 2017

(54) ENERGY STORAGE SYSTEM WITH HEAT PIPE THERMAL MANAGEMENT

(71) Applicant: Tesla Motors, Inc., Palo Alto, CA (US)

(72) Inventors: Robert C. Lane, San Jose, CA (US); Hae-Won Choi, Alameda, CA (US); Jeff Weintraub, San Carlos, CA (US); Carlos Mario Aguirre, Cupertino, CA (US); Mark Riegel, Los Gatos, CA (US); Orion A. King, Menlo Park, CA (US); Nathan Chidiac, Los Altos, CA (US); Jon Wagner, Belmont, CA (US); Augusto E. Barton, Palo Alto, CA (US); Ernest Villanueva, Mountain View, CA (US); David Rosenberg, Lone Rock, WI (US)

(73) Assignee: Tesla, Inc., Palo Alto, CA (US)

( * ) Notice: Subject to any disclaimer, the term of this patent is extended or adjusted under 35 U.S.C. 154(b) by 320 days.

(21) Appl. No.: 14/189,219

(22) Filed: Feb. 25, 2014

(65) Prior Publication Data
US 2015/0244036 A1  Aug. 27, 2015

(51) Int. Cl.
| | |
|---|---|
| *H01M 10/6556* | (2014.01) |
| *H01M 2/20* | (2006.01) |
| *H01M 10/625* | (2014.01) |
| *H01M 10/653* | (2014.01) |
| *H01M 10/6552* | (2014.01) |
| *H01M 10/643* | (2014.01) |

(52) U.S. Cl.
CPC ....... *H01M 10/6556* (2015.04); *H01M 2/206* (2013.01); *H01M 10/625* (2015.04); *H01M 10/643* (2015.04); *H01M 10/653* (2015.04); *H01M 10/6552* (2015.04); *H01M 2220/20* (2013.01)

(58) Field of Classification Search
None
See application file for complete search history.

(56) References Cited

U.S. PATENT DOCUMENTS

| | | |
|---|---|---|
| 6,821,671 B2 | 11/2004 | Hinton et al. |
| 6,933,076 B2 | 8/2005 | Ura et al. |
| 8,231,996 B2 | 7/2012 | Howard et al. |

(Continued)

FOREIGN PATENT DOCUMENTS

| | | |
|---|---|---|
| JP | 09-326264 A | 12/1997 |
| JP | 11-354166 | 12/1999 |
| JP | 2013-157111 A | 8/2013 |
| KR | 1020110023778 A | 3/2011 |

OTHER PUBLICATIONS

Anderson, W.G., et al., "Heat Pipe Cooling of Concentrating Photovoltaic Cells", Advanced Cooling Technologies, Inc., 2008, 6 pages.

(Continued)

*Primary Examiner* — Patrick Ryan
*Assistant Examiner* — Carmen Lyles-Irving
(74) *Attorney, Agent, or Firm* — Garlick & Markison; Bruce E. Garlick

(57) ABSTRACT

An energy storage system includes: multiple cells, each cell having a first end with anode and cathode terminals, and a second end opposite the first end, the cells arranged so that the second ends are aligned; for each of the cells, electrical connections coupled to the anode and cathode terminals at the first end; and a heat pipe having a flat evaporation surface facing the second ends.

10 Claims, 12 Drawing Sheets

(56) References Cited

U.S. PATENT DOCUMENTS

| | | | |
|---|---|---|---|
| 8,828,577 B2* | 9/2014 | Youngs | B60K 6/28 |
| | | | 429/120 |
| 2002/0015892 A1 | 2/2002 | Kitoh | |
| 2010/0266885 A1 | 10/2010 | Lee | |
| 2011/0206965 A1 | 8/2011 | Han et al. | |
| 2011/0318626 A1 | 12/2011 | Bartenschlager | |
| 2012/0009455 A1 | 1/2012 | Yoon | |
| 2012/0049788 A1 | 3/2012 | Kim et al. | |
| 2012/0148881 A1 | 6/2012 | Quisenberry | |
| 2013/0100716 A1 | 4/2013 | Tong et al. | |
| 2013/0107458 A1 | 5/2013 | Tong et al. | |
| 2013/0130074 A1 | 5/2013 | Timmons et al. | |
| 2013/0182421 A1* | 7/2013 | Popper | H01M 2/30 |
| | | | 362/183 |
| 2013/0216888 A1 | 8/2013 | Shimura et al. | |

OTHER PUBLICATIONS

Heat Pipe Selection manuscript dated Dec. 4, 2001, available online at http://www.enertron-inc.com/enertron-resources/pdf/how-to-select-a-heat-pipe.pdf, 6 pages.

International search report in application PCT/US2015/017453, May 29, 2015, 15 pages.

Korean Intellectual Property Office; Notice of Preliminary Rejection; KR Application No. 10-2016-7022534; dated Jun. 12, 2017; 7 pgs (translated).

* cited by examiner

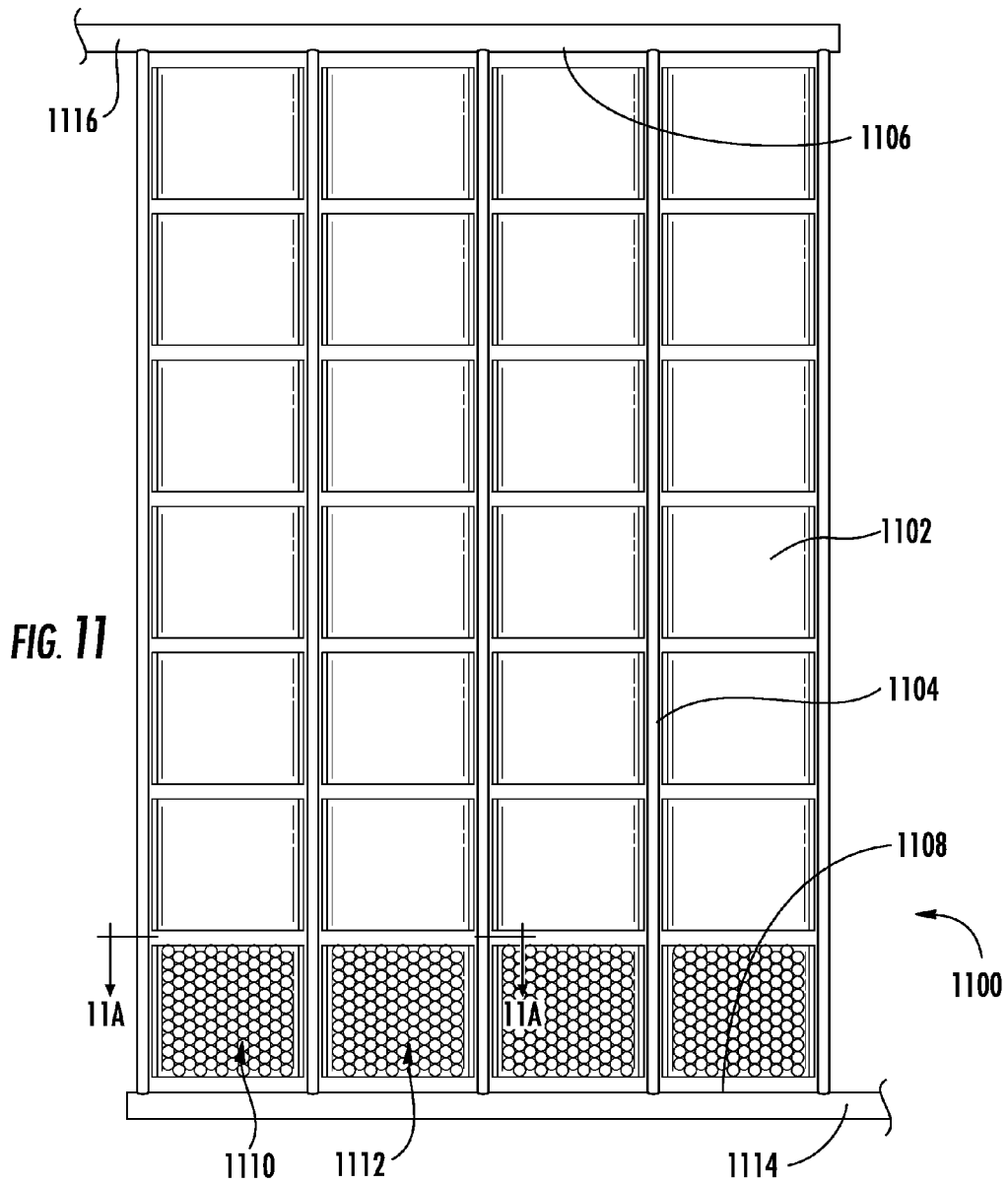
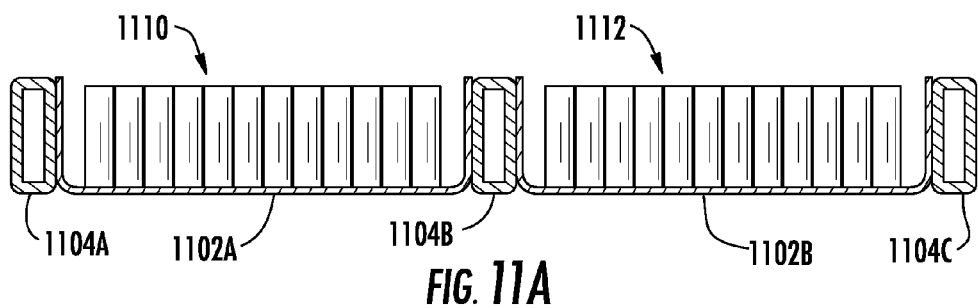

ENERGY STORAGE SYSTEM WITH HEAT PIPE THERMAL MANAGEMENT

BACKGROUND

Energy storage systems are used in a variety of contexts. For example, an electric vehicle can have a number of individual energy storage units (e.g., lithium-ion cells) stored inside a compartment, and this system is often referred to as a battery pack. Cells and other storage units generate heat during operation, such as during the charging process and when the cells are used to deliver energy, for example to the propulsion/traction system of the vehicle.

One cooling approach currently being used involves lithium-ion cells that are electrically connected by an anode terminal at the bottom of the cell, and a cathode terminal on top of the cell. These cells are arranged to all have the same orientation (e.g., "standing up") with some spacing provided between all adjacent cells. The spacing facilitates a cooling conduit to run between the cells and be in contact with at least a portion of the outer surface of each cell. The cooling conduit has a coolant flowing through it, which removes thermal energy from inside the battery pack to some location on the outside, where heat can be safely dissipated. In order to provide a safe coolant flow, one must provide fluid connections into and out of the battery package, and the coolant path inside the battery pack must be reliable and have enough capacity.

SUMMARY

In a first aspect, an energy storage system includes: multiple cells, each cell having a first end with anode and cathode terminals, and a second end opposite the first end, the cells arranged so that the second ends are aligned; for each of the cells, electrical connections coupled to the anode and cathode terminals at the first end; and a heat pipe having a flat evaporation surface facing the second ends.

Implementations can include any or all of the following features. The heat pipe has substantially an L-shape formed by the flat evaporation surface and a flat condensation surface. The energy storage system further includes a heat transfer channel that abuts the flat condensation surface, the heat transfer channel configured to reject thermal energy from, or bring thermal energy to, the multiple cells. There are multiple heat pipes and the multiple cells are positioned in modules arranged in at least two rows, each of the modules is positioned on at least one of the heat pipes, the heat transfer channel extends between the two rows, and flat evaporation surfaces of the heat pipes extend in opposite directions on either side of the heat transfer channel. The multiple cells are positioned so that the second ends are aligned with a vertical plane, and the flat evaporation surface extends along the vertical plane, the heat pipe further includes a flat condensation surface that extends in a horizontal plane above the flat evaporation surface.

The heat pipe has substantially a U-shape formed by first and second flat condensation surfaces joined by the flat evaporation surface. The energy storage system further includes a heat transfer channel that abuts at least one of the first and second flat condensation surfaces, the heat transfer channel configured to reject thermal energy from, or bring thermal energy to, the multiple cells. There are multiple heat pipes and the multiple cells are positioned in modules arranged in at least two rows, wherein each of the modules is positioned on at least one of the heat pipes, wherein the heat transfer channel extends between the two rows. The heat pipes extend in opposite directions on each side of the heat transfer channel, and wherein each of the heat pipes extends along a longest dimension of the corresponding module. The energy storage system further includes at least one other heat transfer channel that abuts at least an opposite one of the first and second flat condensation surfaces. There are multiple heat pipes and the multiple cells are positioned in modules arranged in at least two rows, and each of the modules is positioned on at least one of the heat pipes, the energy storage system further comprising a main heat transfer channel with at least one cross member heat transfer channel configured to reject thermal energy from, or bring thermal energy to, the multiple cells, wherein the cross member heat transfer channel extends between adjacent ones of the modules and abuts the respective flat evaporation surfaces of the adjacent modules. The energy storage system further includes heat transfer channels substantially transverse to the heat pipe, each heat transfer channel having substantially an L-shape profile so that it abuts at least part of one of the condensation surfaces and at least part of the evaporation surface. The multiple cells are positioned so that the second ends are aligned with a vertical plane and the flat evaporation surface extends along the vertical plane, further including substantially flat thermal tubes on the first and second flat condensation surfaces. The thermal tubes include a top thermal tube configured to provide cooling of the energy storage system, and a bottom thermal tube configured to provide heating of the energy storage system. The energy storage system includes substantially parallel manifolds at opposing shorter edges of the energy storage system, the manifolds connected by heat transfer channels that are generally transverse to the manifolds, wherein the condensation surfaces of the heat pipes abut adjacent ones of the heat transfer channels. The energy storage system includes substantially parallel manifolds at opposing longer edges of the energy storage system, the manifolds connected by heat transfer channels that are generally transverse to the manifolds, wherein the condensation surfaces of the heat pipes abut adjacent ones of the heat transfer channels.

There are multiple linear heat pipes and the multiple cells are positioned in modules arranged in at least two rows, and wherein each of the modules is positioned on at least one of the linear heat pipes, the energy storage system further includes a heat transfer channel that is positioned transversely to the multiple linear heat pipes, the two rows positioned on opposite sides of the heat transfer channel. The heat transfer channel is positioned halfway between opposite ends of the multiple linear heat pipes. The energy storage system further includes at least one side heat transfer channel at either of the ends of the multiple linear heat pipes.

There are multiple heat pipes and the multiple cells are positioned in modules arranged in at least two rows, and wherein each of the modules is positioned on at least one of the heat pipes, the energy storage system further comprising a heat transfer channel that is positioned transversely to the multiple heat pipes, the two rows positioned on opposite sides of the heat transfer channel, wherein each of the multiple heat pipes comprises a deformation from a linear configuration where the heat pipe abuts the heat transfer channel, the deformation corresponding to a cross section profile of the heat transfer channel.

The energy storage system further includes an electric insulator material between the flat evaporation surface and the second ends. The energy storage system further includes an adhesive applied between the second ends and the electric insulator material. The cells have cylinder shapes and the second ends are bottoms of the cylinder shapes. The cells are vertically oriented and stand on top of the heat pipe.

BRIEF DESCRIPTION OF DRAWINGS

FIG. 11 shows another example of an energy storage system with heat pipes having a U-shape, with thermal tubes extending between manifolds positioned at shorter sides of the system.

FIG. 11A is a cross section of the energy storage system in FIG. 11.

DETAILED DESCRIPTION

This document describes examples of systems and techniques that provide face cooling of cells or other energy storage units by way of heat pipes. This can provide useful advantages, such as: The need for internal fluid connections in a battery pack can be eliminated, thereby avoiding leakage; a closed loop cooling system can be provided that reduces pressure drop losses with regard to an overall cooling system (e.g., in a vehicle); external cooling tube assemblies can be eliminated; rapid fluid migration can be provided that keeps cells at even temperatures; cooling tube sections between rows of cells can be eliminated, thereby allowing more cells to be packed into a given space; and even if a rupture occurs in one of the heat pipe lumens, significant cooling/heating can nevertheless be provided by way of other undamaged lumens within the heat pipe.

Figure 1:
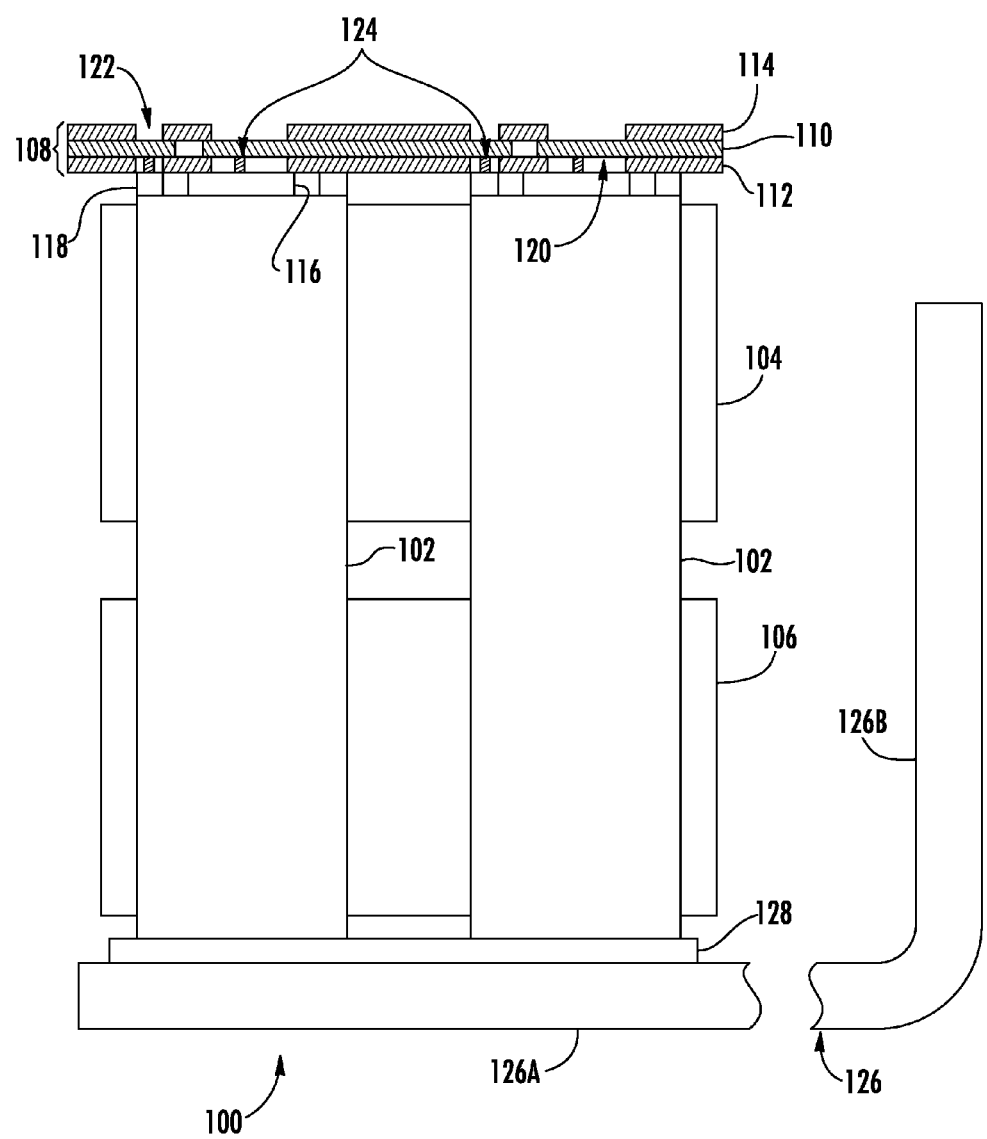
FIG. 1 shows an example of an assembly that is part of an energy storage system.

FIG. 1 shows an example of an assembly 100 that is part of an energy storage system. Particularly, the energy storage system contains an interconnected array of energy storage elements, two cells 102 of which are shown here. In this example, the cells are physically secured and held in place (e.g., to a particular torque value) by a pair of opposing clamshells: a top clamshell 104 and a bottom clamshell 106. For example, the clamshells have openings exposing the respective ends of each cell. In other implementations, the cells can be secured by a different technique, such as by a structure interleaved between cells.

Here, a flexible printed circuit 108 overlies and connects electrical terminals of the cells 102. In this implementation, the flexible printed circuit includes three layers: a flexible conductive layer 110 sandwiched between a flexible bottom insulating layer 112 and a flexible top insulating layer 114. The conducting layer can be a uniform layer of metal, such as copper, and the insulating layers can be uniform layers of polyimide (e.g., a Kapton® material). In other implementations, one or more other materials can be used in lieu of or in combination with the mentioned materials.

Here, the cells 102 are a type of rechargeable battery cell having a flat top with terminals at one end. Particularly, each cell has a center positive terminal 116 and a surrounding annular negative terminal 118. For example, the annular negative terminal can be part of, or mounted on, a main housing of the cell (e.g., the cell can) that extends along the length of the cell and forms the other end of the cell (i.e., the bottom end in this example).

The patterning of flexible printed circuit 108 produces die cut areas 120 in the bottom insulating layer 112 to allow exposed portions of conductive layer 110 to make electrical contact, for example to selectively connect to the terminals of the cell(s). Here, die cut areas 122 in top insulating layer 114 allow exposed portions of conductive layer 110 to receive a device that produces an electromechanical connection between the portion of conductive layer interacting with the device and the underlying surface to be joined (e.g., a terminal of one of the cells 102). Any of several different types of devices and techniques can be used in making the electromechanical joints. For example, spot welds 124 here join portions of the conductive layer 110 to respective terminals of the individual cells.

The energy storage system can be implemented as a source of propulsion energy in an electric vehicle, to name just one example. That is, a number of cells can be interconnected in the energy storage system to form an array (e.g., a battery pack) that powers the vehicle. In other implementations, the illustrated assembly can also or instead power another aspect of a vehicle, or can be used in a non-vehicle context, such as in a stationary storage.

In the illustrated embodiment, the cells 102 are oriented vertically, and are shown standing on a heat pipe 126. The heat pipe can be connected to a thermal management system (not shown) to provide for thermal management of the energy storage system. Cooling of the cells 102 can be performed using an evaporation end 126A that faces the cells, and at least one condensation end 126B. The evaporation end can extend for at least the entire length required by the array of cells, or part thereof. Here, the heat pipe 126 has an L-shape when viewed from the side, with the condensation end elevated above the evaporation end. In other implementations, the heat pipe can have a different shape. For example, and without limitation, more than one condensation end can be provided. In some implementations, the heat pipe can instead provide heating of the cells and the rest of the energy storage system.

In this example, the assembly 100 has an electric insulator layer 128 between the evaporation end 126A of the heat pipe 126 and the bottom of the cells 102. This layer prevents electric contact between the heat pipe (which can be a metal component) and the cell housing. For example, a thermal interface material (TIM) can be used to electrically insulate an anode terminal at the bottom of the cell while allowing cooling/heating of the cells through the same surface. In some implementations, the assembly is manufactured by applying the electric insulator layer on the heat pipe, applying adhesive onto the top of the layer (e.g., at each cell position), and then positioning the cell or cells on the layer.

The heat pipe can be manufactured from any suitable material. In some implementations, the heat pipe can be extruded from metal and have at least one interior channel for the phase-change fluid. The interior channel(s) can have one or more features that aid the flow of fluid in the liquid phase and/or gas phase. For example, a groove, powder and/or sponge can be provided inside the heat pipe.

Figure 2:
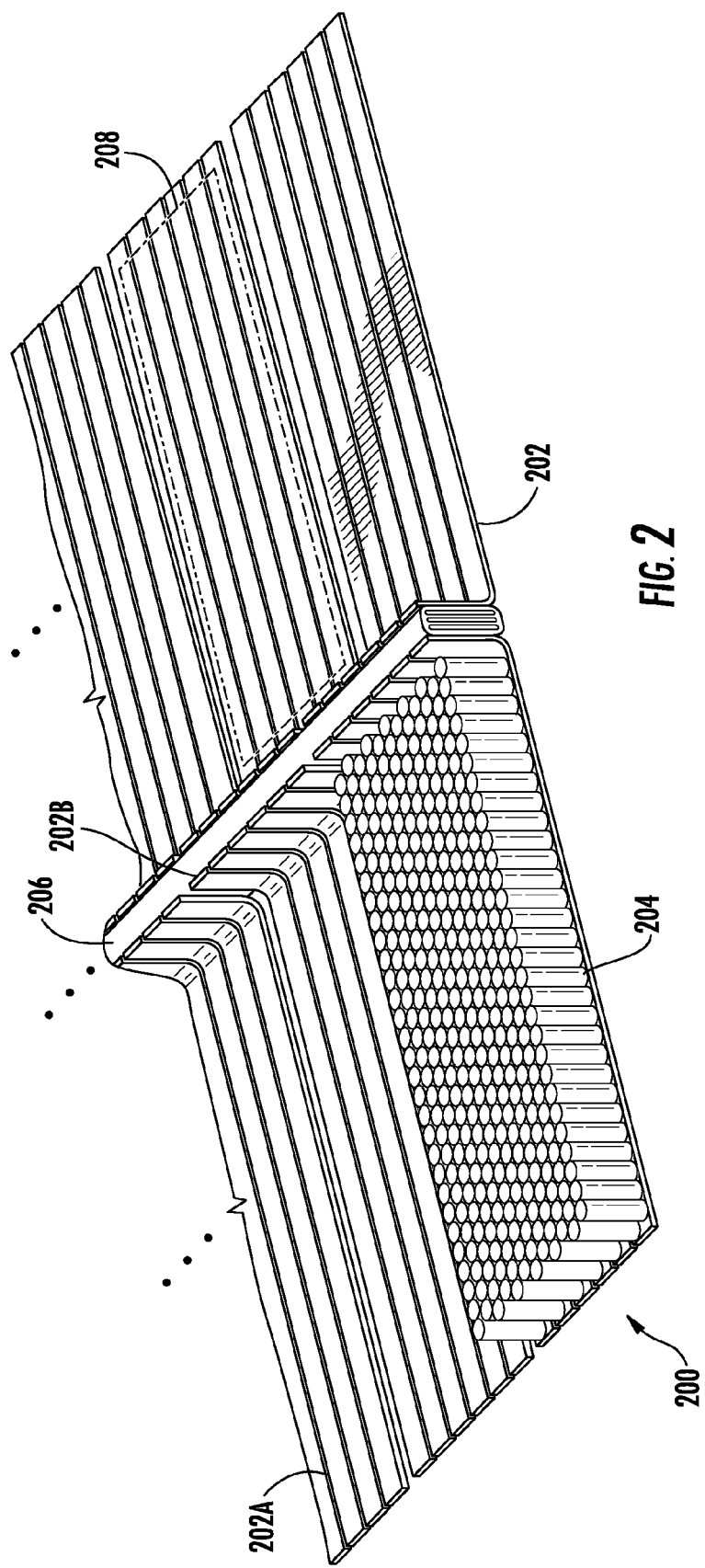
FIG. 2 shows an example of an energy storage system with heat pipes that have an L-shape.

FIG. 2 shows an example of an energy storage system 200 with heat pipes 202 that have an L-shape. In this example, an evaporation surface 202A is oriented essentially horizontally (e.g., inside a battery pack of an electric vehicle) and a condensation surface 202B is oriented essentially vertically. A module 204 of cells (e.g., lithium-ion cells of the 18650 type) is here shown positioned on one of the heat pipes. The interface between the module and the heat pipe is by conductive thermal contact requiring a TIM. For example, the heat pipe can comprise multiple adjacent parallel heat sections attached to each other (e.g., by welding). The module can have more or fewer cells than illustrated in this example, and/or the cells can be arranged in a different configuration. For clarity, only one module of cells is shown here. Implementations of energy storage systems can have any number of modules.

The energy storage system 200 has at least one heat transfer channel 206 that is in thermal exchange with the heat pipes 202. In some implementations, an auxiliary system can circulate fluid, such as coolant, in one or more channels inside the heat transfer channel. For example, the energy storage system described here can be incorporated as a battery pack in an electric (or hybrid) vehicle, and a cooling system external to the battery pack can then cool the fluid from the heat transfer channel, thereby removing heat from the cells.

Here, the heat transfer channel 206 is provided in the middle of the energy storage system 200, and the module 204 and other modules can then be positioned in rows on each side of the channel, for example in a location 208. The condensation ends/surfaces of the respective heat pipes are here positioned so that they abut the sides of the heat transfer channel. Accordingly, the heat pipes extend from the channel in opposite directions. Here, the heat pipe 202 on which the module 204 is positioned is shown to consist of six parallel heat pipe sections. Solely as an example, each of such sections can contain 14 separate internal channels, each of which individually operates according to the principle of a heat pipe.

Figure 3:
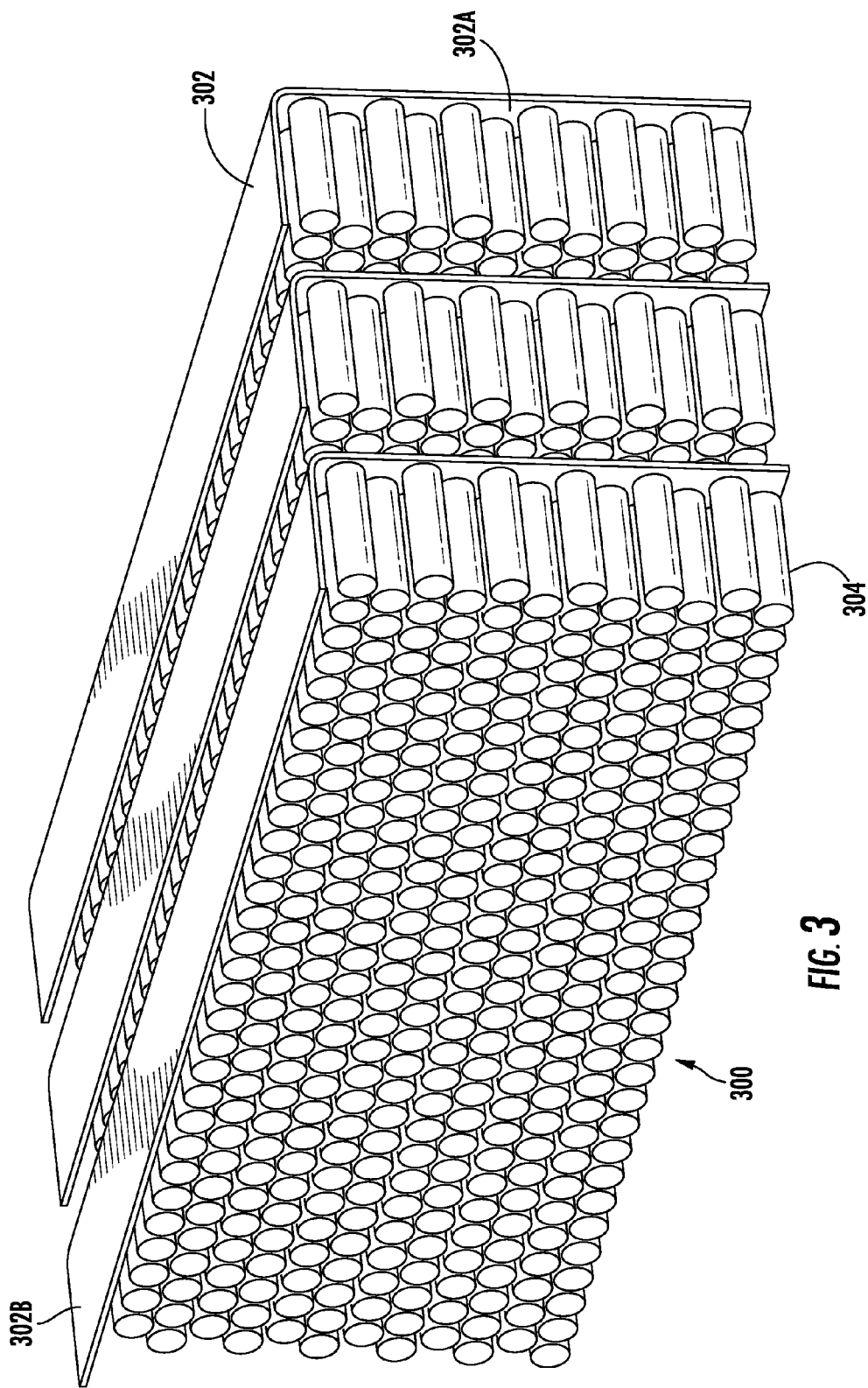
FIG. 3 shows another example of an energy storage system with heat pipes that have an L-shape.

FIG. 3 shows another example of an energy storage system 300 with heat pipes 302 that have an L-shape. Each of the heat pipes has a module 304 of cells associated with it. The cells are aligned with each other so that one of their ends (e.g., the bottom end, or a negative end) faces an evaporation surface 302A of the heat pipe. In this implementation, the cells are positioned essentially horizontally and the evaporation surface is vertical. A condensation surface 302B of the heat pipe, however, is elevated above the evaporation surface and is horizontal in this example. In some implementations, a cooling surface can be formed by all the condensation surfaces collectively, or can be a separate surface applied on top of them. Such a cooling surface can then be used for removing heat from all of the cell modules. For example, the cooling surface can be provided with a common active cooling channel (analogous to the heat transfer channel 206 of FIG. 2); heat spreaders transverse to the cooling channel can then accumulate heat from the respective condensation surfaces and transport that heat to the cooling channel.

Figure 4:
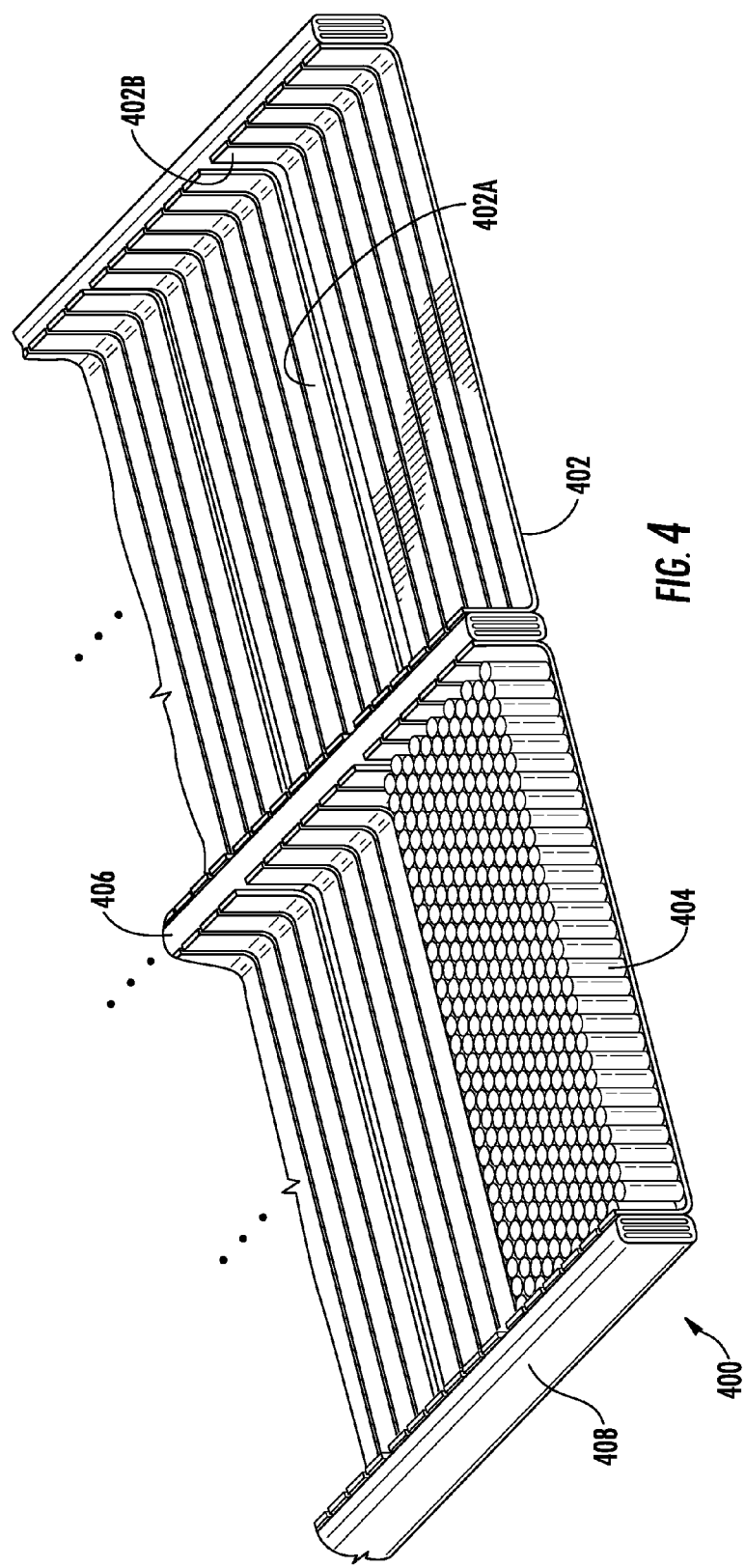
FIG. 4 shows an example of an energy storage system with heat pipes that have a U-shape.

FIG. 4 shows an example of an energy storage system 400 with heat pipes 402 that have a U-shape. That is, each of the heat pipes has an evaporation surface 402A and two condensation surfaces 402B, one at either end of the evaporation surface. Each of the heat pipes has a module 404 of cells associated with it. For example, this system can be useful in a vehicle, because the U-shaped heat pipes provide increased independence from angularity changes (e.g., when the vehicle is operating on an inclined and/or graded surface).

The energy storage system has a central heat transfer channel 406 and one or more side heat transfer channels 408, each of which is in thermal exchange with the heat pipes 402. Here, the side heat transfer channels are provided at the ends of the heat pipes opposite the central heat transfer channel. In this implementation, the heat pipes are oriented along the length of the modules 404. For example, this energy storage system can provide an advantageously small ratio of condensation area relative to evaporation area, which allows the cooling tube to occupy a relatively small volume of the battery pack.

Figure 5:
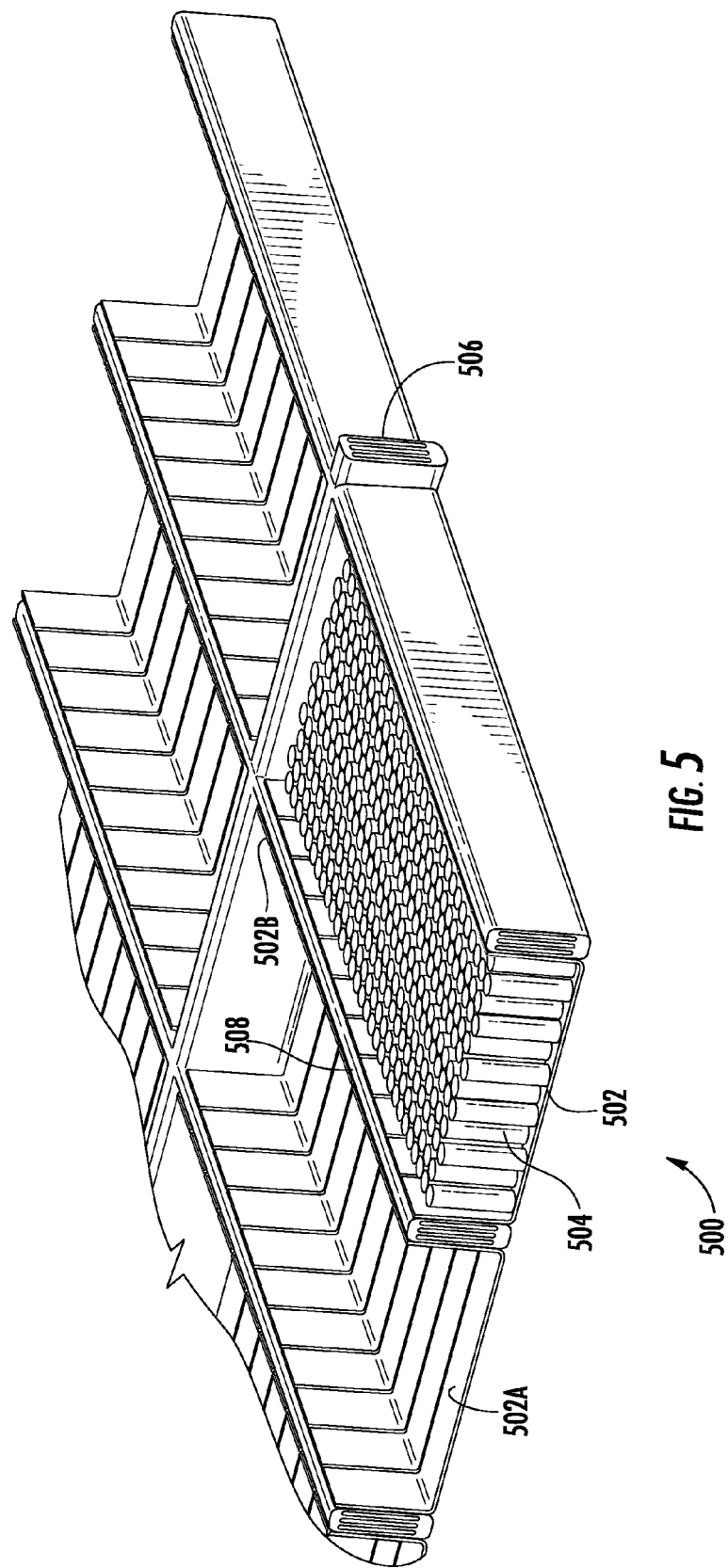
FIG. 5 shows another example of an energy storage system with heat pipes that have a U-shape.

FIG. 5 shows another example of an energy storage system 500 with heat pipes 502 that have a U-shape. Each of the heat pipes has an evaporation surface 502A and two condensation surfaces 502B, one at either end of the evaporation surface. Each of the heat pipes has a module 504 of cells associated with it. The energy storage system has a central heat transfer channel 506 and one or more cross member heat transfer channels 508, each of which is in thermal exchange with the heat pipes 502. The cross member heat transfer channels are transverse to the central channel; for example, the cross member can extend equally far on both sides thereof. A heat transfer medium (e.g., coolant) can flow in the heat transfer channels to provide thermal exchange with the heat pipes. Here, the heat pipes are oriented across the width of each battery module. For example, this energy storage system can provide an advantageously small ratio of condensation area relative to evaporation area.

Figure 6:
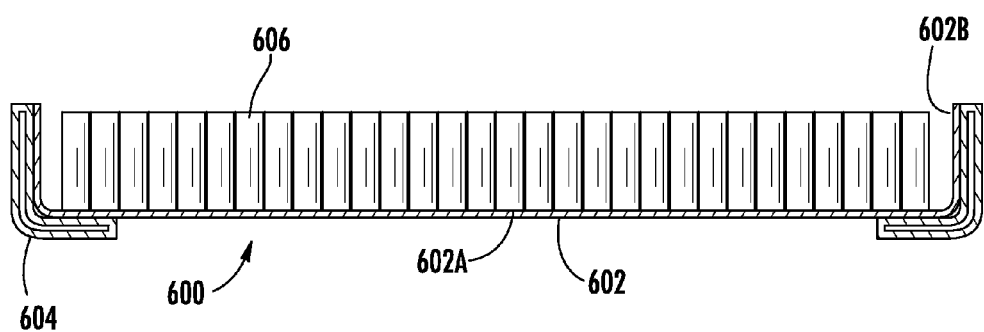
FIG. 6 shows another example of an energy storage system with one or more heat pipes that have a U-shape, also including coolant tubes.

FIG. 6 shows another example of an energy storage system 600 with one or more heat pipes 602 that have a U-shape, also including coolant tubes 604. Each of the heat pipes has an evaporation surface 602A and two condensation surfaces 602B, one at either end of the evaporation surface. This example shows a module 606 of cells in the energy storage system. For example, during operation the heat pipe can convey heat in both directions along the evaporation surface, towards each respective condensation surface. That is, the thermal flow inside the heat pipe is here parallel to the plane of this drawing.

This energy storage system also has the coolant tubes 604 that are in thermal exchange with the heat pipes 602. In this example, each of the coolant tubes has an essentially L-shaped profile. For example, the profile of the L-shape can at least partially correspond to the outer surface of the U-shaped heat pipe. This provides an advantageously large surface area of contact between the coolant tube and the heat pipe, which facilitates thermal exchange between them. The coolant tubes 604 can provide reversibility (i.e., the ability to do both heating and cooling) of the heat pipe. For example, the L-shaped profile of the coolant tubes facilitates removal of heat from the evaporation surface 602A during cooling of the module, and also delivery of heat from the condensation surfaces 602B to the module during heating. As another example, the shape and configuration of the system in this example can help reduce gravitational issues that might otherwise occur, such as if the grooves of the heat pipe are not manufactured to give effective capillary force. This configuration can also improve the way that the U-shaped heat pipe is packaged inside a housing or other structure that holds the energy storage system.

The coolant tube has one or more interior channels in which coolant can be circulated within the system (i.e., the coolant can flow in directions into, and out of, the plane of the figure). The two coolant tubes in this example can have coolant flowing in the opposite, or the same, direction as each other. In some implementations, the coolant tube can be used for providing reversible thermal transfer, such that the energy storage system can be cooled or heated depending on what is needed. For example, the condenser contact here extends onto the flat portion of the heat pipe and can therefore also be used for delivering heat (e.g., from an external heating system) into the heat pipe, from where the heat then flows into the individual cells.

Figure 7:
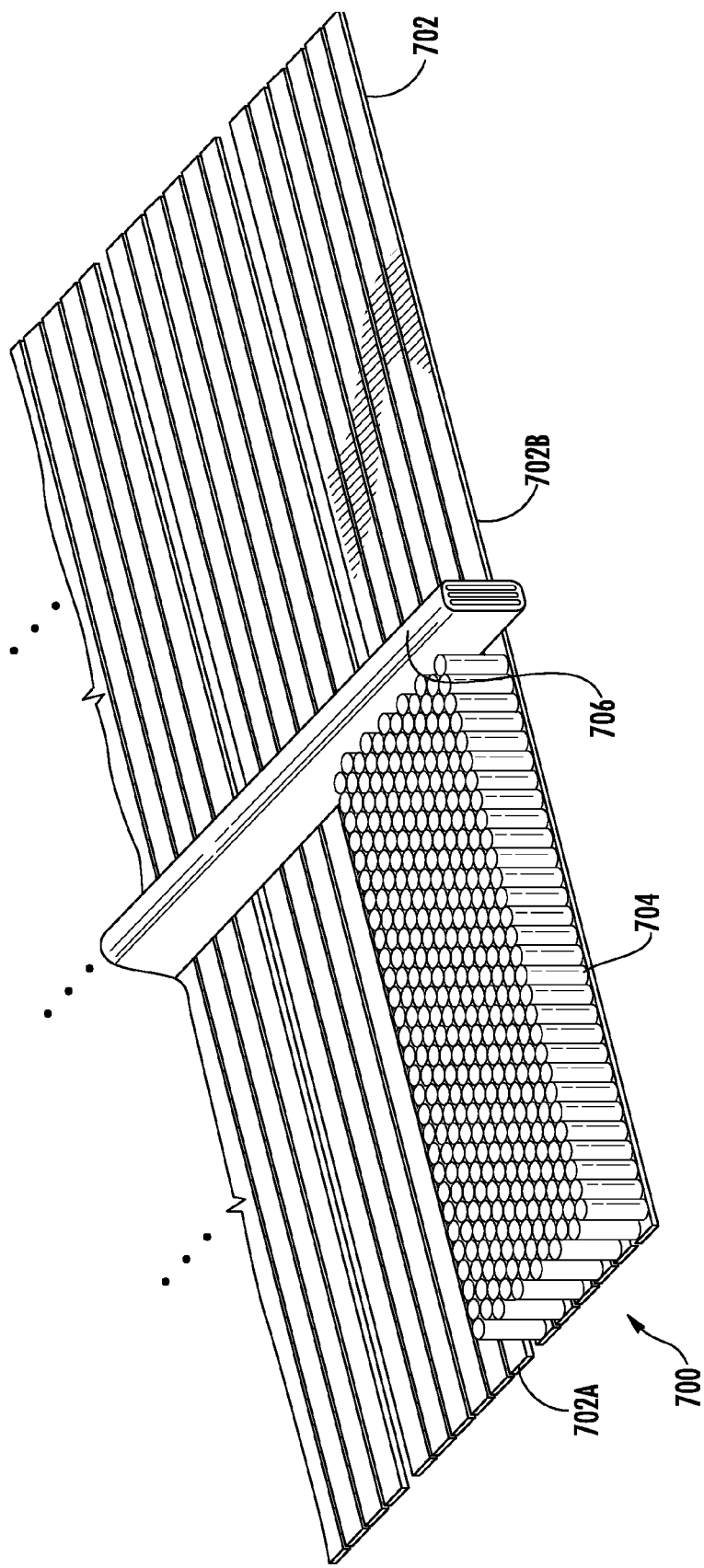
FIG. 7 shows an example of an energy storage system with linear heat pipes.

FIG. 7 shows an example of an energy storage system 700 with linear heat pipes 702. Each of the heat pipes has a module 704 of cells associated with it. The energy storage system has a central heat transfer channel 706 that can have coolant flowing through it. Here, an end portion 702A of each heat pipe serves as an evaporation area, and a central portion 702B of the heat pipe (i.e., near the heat transfer channel) serves as a condensation area. The internal channel(s) of the heat pipe can be truncated at the central heat transfer channel, or can extend along the length of the heat pipe. This energy storage system can provide a relatively large ratio of evaporation area relative to condensation area, and can work reversibly (i.e., to provide heating instead of cooling). Also, this implementation can be efficient in terms of volumetric energy density.

Figure 8:
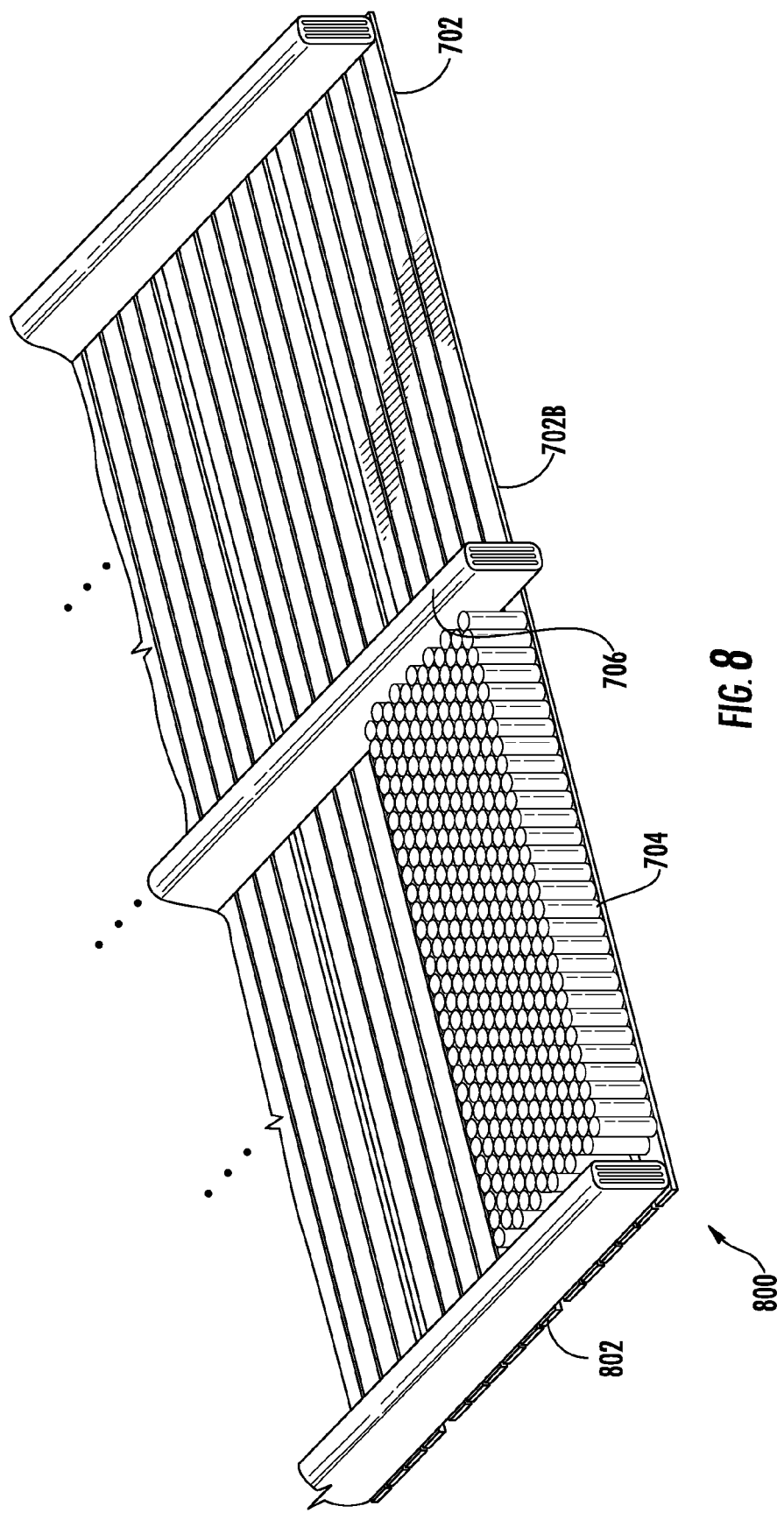
FIG. 8 shows another example of an energy storage system with the linear heat pipes from FIG. 7.

FIG. 8 shows another example of an energy storage system 800 with the linear heat pipes 702 from FIG. 7. The system here also has the module 704 of cells, and the central heat transfer channel 706. In addition, the system has one or more side heat transfer channels 802 through which coolant can flow. For example, the side channel(s) can be positioned at the ends of the heat pipes. This system can be useful in a vehicle, because the positions of the central and side heat transfer channels provide increased independence from angularity changes (e.g., when operating the vehicle on an inclined and/or graded surface). As another example, the system can provide reversible heat transfer, such as for heating the cells instead of cooling them.

Figure 9:
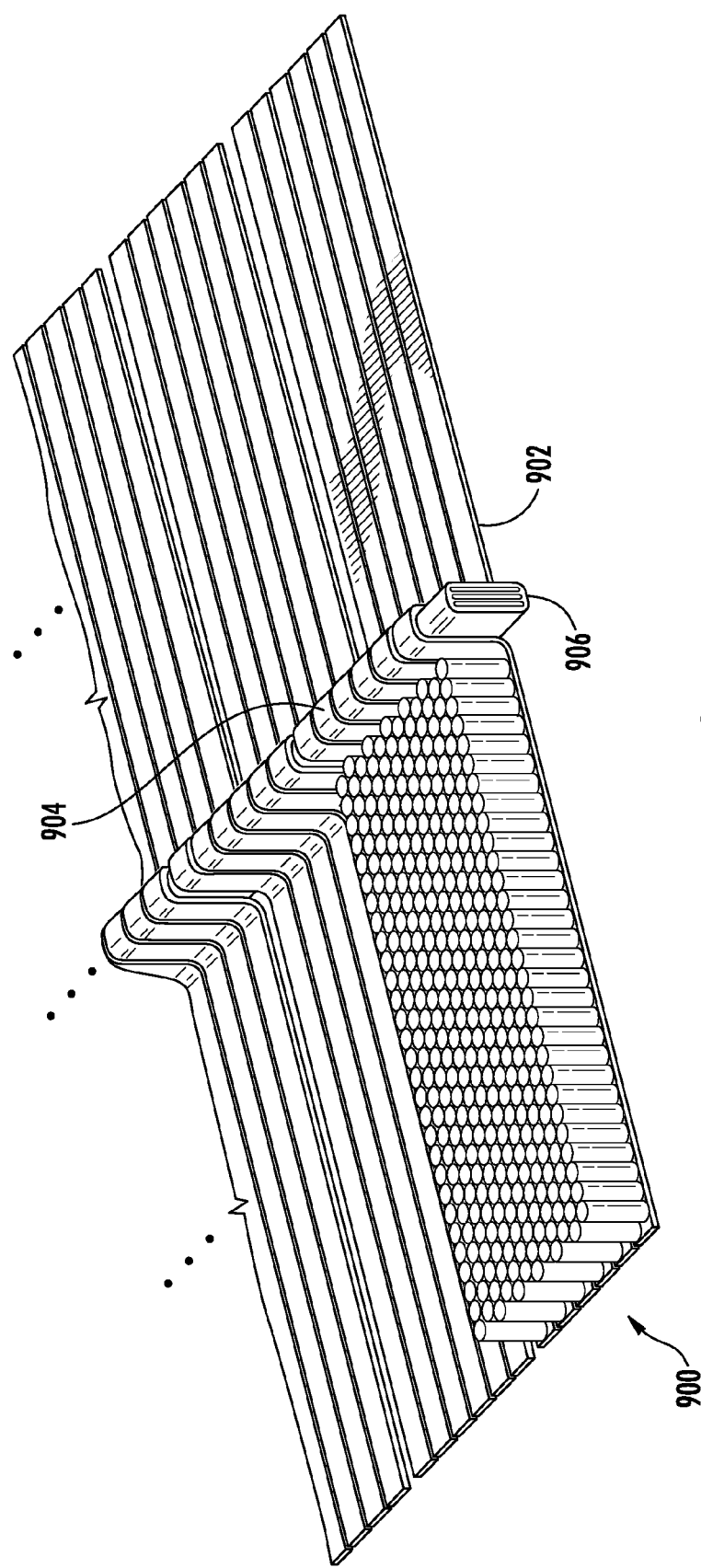
FIG. 9 shows an example of an energy storage system where heat pipes have a deformation corresponding to a cross section profile of a heat transfer channel.

FIG. 9 shows an example of an energy storage system 900 where heat pipes 902 have a deformation 904 corresponding to a cross section profile of a heat transfer channel 906. That is, while the heat pipes are here generally linear in areas where the battery cell modules are located, the heat pipe here has the deformation so as to conform a condensation end of the heat pipe to the shape of the heat transfer channel. The internal channel(s) of the heat pipe can be truncated at the central heat transfer channel, or can extend along the length of the heat pipe. For example, this system can provide a smaller ratio of condensation area relative to evaporation area than a corresponding L-shape heat pipe.

Figure 10:
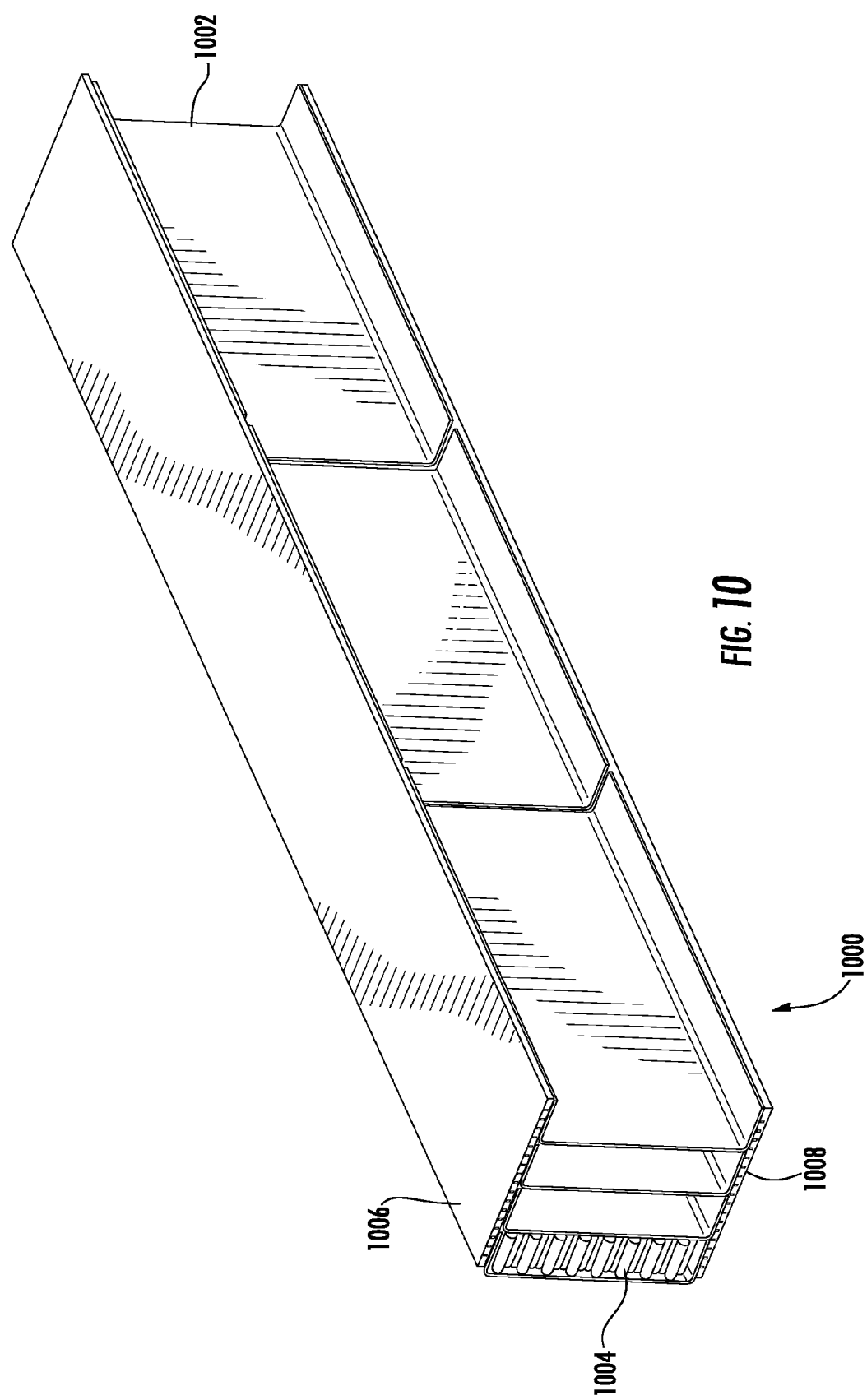
FIG. 10 shows another example of an energy storage system with heat pipes having a U-shape, with thermal tubes on top and bottom.

FIG. 10 shows another example of an energy storage system 1000 with heat pipes 1002 having a U-shape, with thermal tubes on top and bottom. Each heat pipe encloses a module 1004 of cells, only one of which modules is shown here for simplicity. The heat pipes are organized so that the system has four heat pipes across its width, and three (sets of four) heat pipes along its length. Other configurations and/or numbers of heat pipes can be used in other implementations. For example, and without limitation, the energy storage system could have a width of one heat pipe. In yet another implementation, one or more heat pipes can instead be transverse to the length of the energy storage system.

Here, the energy storage system 1000 is arranged so that the larger surface of the heat pipes—i.e., the one abutting the non-terminal ends of the cells—is generally vertical. The two opposing heat pipe surfaces—which abut the side surfaces of the outermost rows of cells—are generally horizontal.

Thermal tubes 1006 and 1008 are placed on the top and bottom of the heat pipes, respectively. Each thermal tube is manufactured of a material with sufficient thermal conductivity to absorb heat from, or deliver heat into, the heat pipes through the facing surface. For example, the thermal tube can have a number of internal channels configured for having a fluid (e.g., coolant) flowing therein. As such, the thermal tubes can be connected to an external cooling/heating system (not shown), which can be located outside the housing of the energy storage system.

As a first example, both the thermal tubes 1006 and 1008 can be used for cooling the cells of the energy storage system by way of a flowing coolant. In some implementations, coolant flows in opposite directions in the two respective thermal tubes.

As a second example, the thermal tube 1006 (i.e., on top) can be used for cooling the cells, and the thermal tube 1008 (i.e., on the bottom) can be used for heating the cells. This configuration is advantageous in that the heat pipe operates aided by gravity, rather than against gravity, and is more efficient as a result. In a normally vertical heat pipe section the vapor will always move upward unless the vehicle orientation is rotated by at least 90 degrees. The above advantage can therefore be relatively unaffected by vehicle orientation. Both when the batteries are being cooled and when they are being heated, the less dense vapor will move upward (opposite to gravity) and the fluid will move downward (with gravity). That is, during operation, when the cells (and/or other electrical devices in the system) are generating heat, the upper thermal tube can serve to cool the system by way of removing thermal energy from the heat pipes. In contrast, when the cells (and/or the rest of the energy storage system) need to be warmed up, such as before operating the system in a cold environment, the lower thermal tube can serve to warm the system by way of introducing thermal energy into the heat pipes. For example, the flow of cooling/heating fluid can be directed to either the upper or lower thermal tube, as applicable, by way of a valve, such as a solenoid valve.

FIG. 11 shows another example of an energy storage system 1100 with heat pipes 1102 having a U-shape, with thermal tubes 1104 extending between manifolds 1106 and 1108 positioned at shorter sides of the system. The heat pipes hold modules of cells adjacent the thermal tubes, of which only modules 1110 and 1112 of cells are shown for clarity. That is, in this example the thermal tubes are parallel to the length of the energy storage system (e.g., a battery pack).

The manifolds 1106-08 and the thermal tubes 1104 have one or more channels inside them to facilitate flow of a fluid (e.g., coolant) to various parts of the system. For example, the manifold 1108 can be the inlet manifold, receiving fluid from at least one inlet 1114, and the manifold 1106 can be the outlet manifold, with fluid exiting through at least one outlet 1116. Between the two manifolds, the fluid passes in the interior channels of the thermal tubes 1104, and in so doing provides thermal exchange (e.g., cooling) of the cells by way of the heat pipes.

FIG. 11A is a cross section of the energy storage system in FIG. 11. Particularly, modules 1110 and 1112 of cells are shown positioned in heat pipes 1102A and 1102B, respectively. The heat pipes, in turn, are positioned between respective thermal tubes 1104A, B and C. For example, in operation the heat from the module 1110 is conveyed by way of the heat pipe 1102A into the thermal tubes 1104A and B, whereas the heat from the module 1112 is conveyed by way of the heat pipe 1102B into the thermal tubes 1104B and C. Some configurations can have the heat pipes and/or thermal tubes arranged in other ways.

Figure 12:
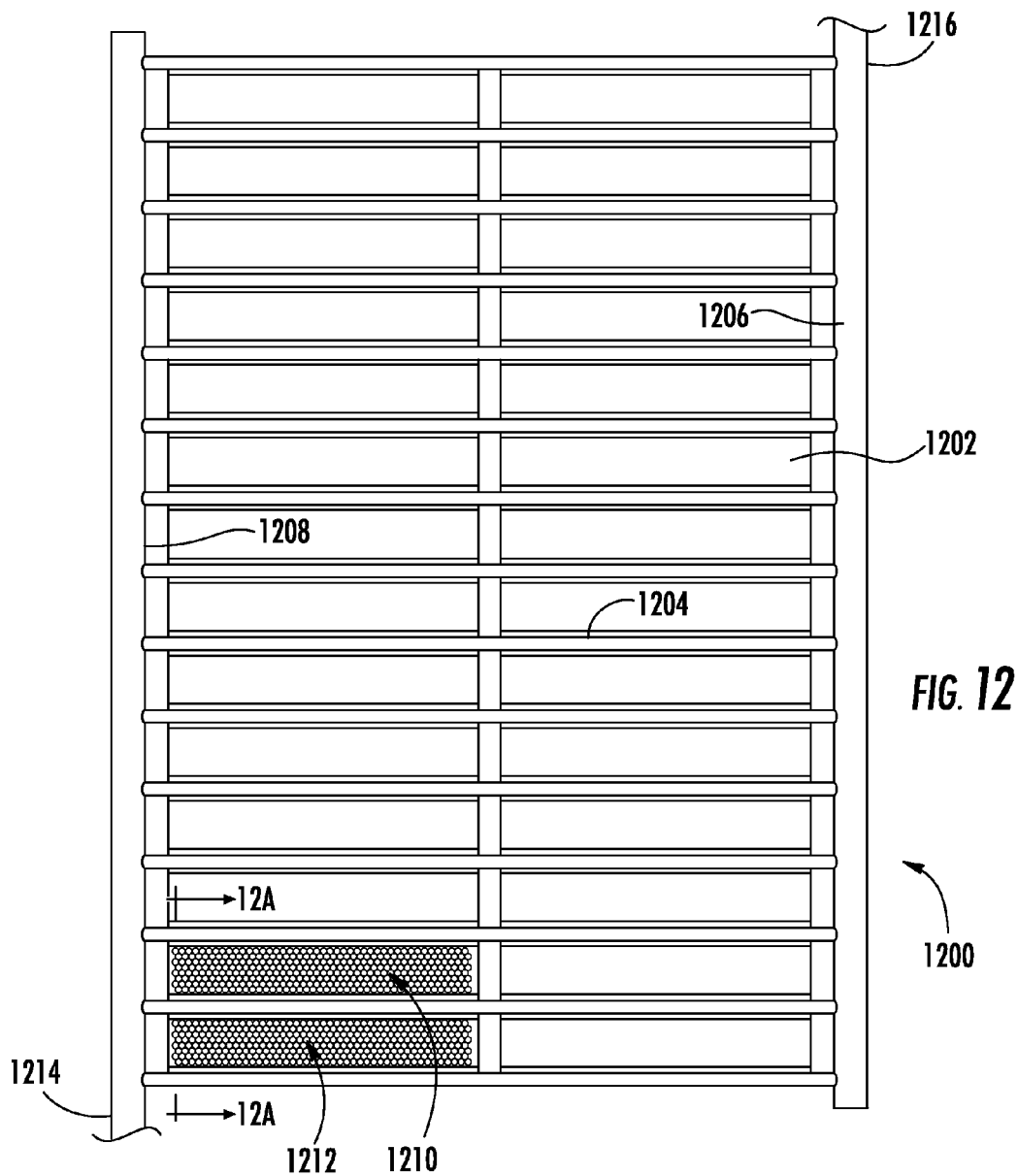
FIG. 12 shows another example of an energy storage system with heat pipes having a U-shape, with thermal tubes extending between manifolds positioned at longer sides of the system.

FIG. 12 shows another example of an energy storage system 1200 with heat pipes 1202 having a U-shape, with thermal tubes 1204 extending between manifolds 1206 and 1208 positioned at longer sides of the system. The heat pipes hold modules of cells adjacent the thermal tubes, of which only modules 1210 and 1212 of cells are shown for clarity. That is, in this example the thermal tubes are transverse to the length of the energy storage system (e.g., a battery pack).

The manifolds 1206-08 and the thermal tubes 1204 have one or more channels inside them to facilitate flow of a fluid (e.g., coolant) to various parts of the system. For example, the manifold 1208 can be the inlet manifold, receiving fluid from at least one inlet 1214, and the manifold 1206 can be the outlet manifold, with fluid exiting through at least one outlet 1216. Between the two manifolds, the fluid passes in the interior channels of the thermal tubes 1204, and in so doing provides thermal exchange (e.g., cooling) of the cells by way of the heat pipes.

Figure 12A:
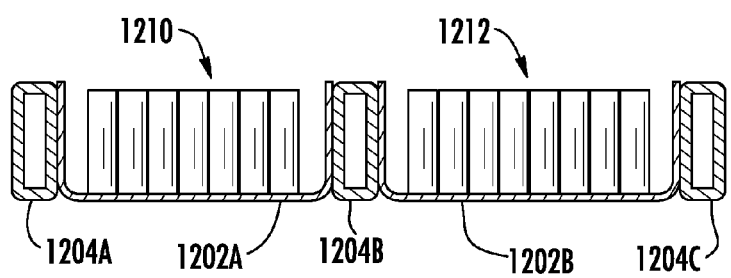
FIG. 12A is a cross section of the energy storage system in FIG. 12.

FIG. 12A is a cross section of the energy storage system in FIG. 12. Particularly, modules 1210 and 1212 of cells are shown positioned in heat pipes 1202A and 1202B, respectively. The heat pipes, in turn, are positioned between respective thermal tubes 1204A, B and C. For example, in operation the heat from the module 1210 is conveyed by way of the heat pipe 1202A into the thermal tubes 1204A and B, whereas the heat from the module 1212 is conveyed by way of the heat pipe 1202B into the thermal tubes 1204B and C. Some configurations can have the heat pipes and/or thermal tubes arranged in other ways.

As used herein, the term "heat pipe" is used in a broad sense to include a number of techniques, such as phase change thermal systems that use highly conductive materials and have a substantially flat form factor. The term heat pipe includes, but is not limited to, grooved style heat pipes, heat pins, vapor chambers, pyrolytic graphite sheets, and other technologies where heat is transferred between interfaces by way of thermal conduction and phase transition.

A number of implementations have been described as examples. Nevertheless, other implementations are covered by the following claims.

What is claimed is:

1. An energy storage system comprising:
    multiple cells, each cell having a first end with anode and cathode terminals, and a second end opposite the first end, the cells arranged so that the second ends are aligned;
    for each of the cells, electrical connections coupled to the anode and cathode terminals at the first end;
    a first heat pipe having a first flat evaporation surface facing the second ends, wherein the first heat pipe has a U-shape formed by first and second flat condensation surfaces joined by the first flat evaporation surface;
    a second heat pipe having a second flat evaporation surface facing the second ends, wherein the second heat pipe has a U-shape formed by third and fourth flat condensation surfaces joined by the second flat evaporation surface; and
    a heat transfer channel wherein one side of the heat transfer channel abuts at least one of the first and second flat condensation surfaces, and wherein another side of the heat transfer channel abuts at least one of the third and fourth flat condensation surfaces, the heat transfer channel configured to reject thermal energy from, or bring thermal energy to, the multiple cells.

2. The energy storage system of claim 1, wherein there are multiple heat pipes and the multiple cells are positioned in modules arranged in at least two rows, wherein each of the modules is positioned on at least one of the heat pipes, wherein the heat transfer channel extends between the two rows.

3. The energy storage system of claim 2, wherein the first heat pipes and the second heat pipe extend in opposite directions from the one side and the another side of the heat transfer channel, and wherein each of the heat pipes extends along a longest dimension of a corresponding module.

4. The energy storage system of claim 2, further comprising at least one other heat transfer channel that abuts at least an opposite one of the first and second flat condensation surfaces.

5. The energy storage system of claim 1, further including a third heat pipe attached to the one side of the heat transfer channel, wherein multiple cells are positioned in modules arranged in at least two rows, and wherein each of the modules is positioned on at least one of the heat pipes, the energy storage system further comprising a cross member heat transfer channel, wherein the cross member heat transfer channel extends between the first heat pipe and the third heat pipe.

6. The energy storage system of claim 1, wherein the heat transfer channel has an L-shape profile so that it abuts at least part of one of the first and second flat condensation surfaces and at least part of the first evaporation surface.

7. The energy storage system of claim 1, wherein the multiple cells are positioned so that the second ends are aligned with a vertical plane and the first flat evaporation surface and second flat evaporation surface extends along the vertical plane, further comprising flat thermal tubes on the first and second flat condensation surfaces, wherein one of flat thermal tubes is the heat transfer channel.

8. The energy storage system of claim 7, wherein the thermal tubes comprise a top thermal tube configured to provide cooling of the energy storage system, and a bottom thermal tube configured to provide heating of the energy storage system.

9. The energy storage system of claim 1, wherein the cells have cylinder shapes and the second ends are bottoms of the cylinder shapes.

10. The energy storage system of claim 9, wherein the cells are vertically oriented and stand on top of the heat pipes.

* * * * *